United States Patent
Wilms

(10) Patent No.: US 12,157,438 B2
(45) Date of Patent: Dec. 3, 2024

(54) WIPER BLADE APPARATUS

(71) Applicant: Robert Bosch GmbH, Stuttgart (DE)

(72) Inventor: Christian Wilms, Beringen-Koersel (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/358,185

(22) Filed: Jul. 25, 2023

(65) Prior Publication Data

US 2024/0034275 A1    Feb. 1, 2024

(30) Foreign Application Priority Data

Jul. 28, 2022  (DE) ..................... 10 2022 207 752.0

(51) Int. Cl.
*B60S 1/38*  (2006.01)
*B60S 1/04*  (2006.01)
*B60S 1/34*  (2006.01)

(52) U.S. Cl.
CPC ............. *B60S 1/381* (2013.01); *B60S 1/3881* (2013.01); *B60S 2001/3836* (2013.01)

(58) Field of Classification Search
CPC .... B60S 1/3806; B60S 1/3881; B60S 1/3848; B60S 1/3879; B60S 1/381; B60S 2001/3836; B60S 2001/3812
USPC ....................................... 15/250.43, 250.201
See application file for complete search history.

(56) References Cited

FOREIGN PATENT DOCUMENTS

| DE | 10044913 A1 | * | 12/2001 | ............ B60S 1/3806 |
| DE | 102009007617 A1 | * | 8/2009 | ................ B60S 1/38 |
| DE | 102018251712 A1 | * | 7/2020 | |
| WO | WO-9919178 A2 | * | 4/1999 | ............ B60S 1/3801 |
| WO | WO-2020136079 A1 | * | 7/2020 | ............ B60S 1/3808 |

OTHER PUBLICATIONS

Machine translation of description portion of German publication 102009007617, published Aug. 2009. (Year: 2009).*
Machine translation of description portion of WO publication 2020136079, published Jul. 2020. (Year: 2020).*

* cited by examiner

*Primary Examiner* — Gary K. Graham
(74) *Attorney, Agent, or Firm* — Michael Best & Friedrich LLP

(57) ABSTRACT

A wiper blade apparatus with at least one spring strip having at least one wiper strip unit, which comprises at least one wiper lip and at least one wiper base body, which bounds at least one recess to a receptacle of the at least one spring strip and at least one damping cavity that is separate from the recess, and having at least one wind deflector unit, which at least partially overlaps with the wiper base body of the wiper strip unit and which comprises at least two guide bars, which extends to both sides of the wiper base body. It is proposed that the wiper strip unit comprise at least one resilient support elements arranged on the wiper base body and supported between the wiper base body and at least one of the guide bars.

18 Claims, 2 Drawing Sheets

WIPER BLADE APPARATUS

BACKGROUND

A wiper blade apparatus has already been proposed with at least one spring strip, having at least one wiper strip unit, which comprises at least one wiper lip and at least one wiper base body, which bounds at least one recess to a receptacle of the at least one spring strip and at least one damping cavity that is separate from the recess, and having at least one wind deflector unit, which at least partially overlaps with the wiper base body of the wiper strip unit and which comprises at least two guide bars, which extends to both sides of the wiper base body.

SUMMARY

The invention proceeds from a wiper blade apparatus with at least one spring strip having at least one wiper strip unit, which comprises at least one wiper lip and at least one wiper base body, which bounds at least one recess to a receptacle of the at least one spring strip and at least one damping cavity that is separate from the recess, and having at least one wind deflector unit, which at least partially overlaps with the wiper base body of the wiper strip unit and which comprises at least two guide bars, which extends to both sides of the wiper base body.

It is proposed that the wiper strip unit comprise at least one resilient support elements arranged on the wiper base body and supported between the wiper base body and at least one of the guide bars.

In this context, a "wiper blade" is understood to mean at least one part, in particular a sub-assembly, of a wiper blade, in particular a window wiper blade and advantageously a vehicle window wiper blade. In particular, the wiper blade apparatus can also comprises the entire wiper blade, in particular the entire window wiper blade, and advantageously the entire vehicle window wiper blade. It is contemplated that the wiper blade apparatus be configured at least as part of a wiper blade in a flat-beam design and/or as a wiper blade in a flat-beam design. The wiper blade apparatus is advantageously provided for use on a vehicle. The wiper blade apparatus is preferably provided for cleaning a surface, in particular a surface of a window on a vehicle. In particular, the wiper blade apparatus is coupled to a vehicle, in particular a wiper arm of a vehicle, for cleaning a vehicle window. In this context, "coupled" is understood to mean in particular connected by form fit and/or force fit. "Provided" is understood in particular as meaning specifically adapted, specifically designed and/or specifically equipped. An object being provided for a particular function should in particular, be understood to mean that the object fulfills and/or performs this particular function in at least one application state and/or operating state.

A "wiper strip unit" is intended in particular to mean a unit consisting of at least one resilient material that is provided so as to be moved in contact over a surface to be cleaned in order to clean the surface to be cleaned, in particular a window surface, preferably a vehicle window surface. Preferably, the wiper strip unit comprises a wiper base body and a wiper lip. The wiper lip preferably forms the contact region of the wiper strip unit with the window to be cleaned. The wiper base body is formed so as to be spaced apart by the wiper lip from the window to be cleaned. The wiper base body is preferably fixedly, in particular integrally, connected to the wiper. Preferably, the wiper strip unit is made of a natural or artificial elastomer, in particular a plastic and/or rubber.

Preferably, the wiper base body of the wiper strip unit is configured so as to at least partially receive at least one spring strip for stabilization. To receive the spring strip, the wiper strip unit in particular at least partially and preferably completely forms a recess. In this context, a "spring strip receptacle" is understood to be in particular a channel or groove that is provided so as to at least partially receive the spring strip. Preferably, the spring strip receptacle is provided for substantially encompassing the spring strip over at least a substantial part of a main extension direction. In particular, the wiper strip unit forms at least one spring strip receptacle configured as a spring strip channel, which is provided for completely receiving the at least one spring strip. Alternatively or additionally, the wiper strip unit forms two spring strip receptacles configured as lateral receiving grooves, which are provided for partially receiving at least one respective spring strip. The at least one spring strip receptacle allows the at least one wiper strip unit to be configured so as to be connectable to the at least one spring strip. The dimensions of the at least one spring strip receptacle are adapted to the shape and size of the at least one spring strip. Advantageously, the wiper strip unit is connected to the spring strip by means of a form fit, in particular a force fit.

A "spring strip" is understood in particular as a macroscopic element having at least one extension, which, in a normal operating state, can be elastically changed by at least 10%, in particular by at least 20%, preferably by at least 30%, and particularly advantageously by at least 50%, and which in particular produces a drag, which is dependent on a change in the extension, is preferably proportional to the change, and counteracts the change. Preferably, the spring strip is at least partially formed from a spring steel. Alternatively or additionally, it is conceivable that the spring strip is formed at least in part from a plastic material, a composite material, or another material that appears to be expedient to a person skilled in the art. Preferably, in an unstressed state, the spring strip has substantially a shape of a bent rod, and particularly advantageously a flattened, bent rod. The spring strip is further advantageously configured as a single piece. Alternatively, the spring strip can also be configured in multiple pieces. Particularly advantageous, a curvature of the spring strip along the spring strip in an unstressed state is greater than a curvature of a vehicle window surface of a motor vehicle, in particular a vehicle window, over which the spring strip is guided in at least one operating state. An "elastic object" is understood in particular as an object which can repeatedly be deformed without the object thereby being mechanically damaged or destroyed, and which in particular automatically strives to return to a basic shape after deformation. Preferably, the wiper blade apparatus comprises at least two, in particular exactly two, spring strips. In particular, an "extension" of an element is understood to mean a maximum distance of two points of a perpendicular projection of the element onto a plane. A "macroscopic element" is understood in particular to mean an element having an extension of at least 1 mm, in particular at least 5 mm and preferably at least 10 mm.

In this context, a "wind deflector unit" is understood in particular as a unit that is provided so as to repel an air inflow or a driving wind acting on the wiper blade apparatus and/or to use it in order to press the wiper blade onto a surface to be wiped. Preferably, the wind deflector unit consists at least partially of rubber and/or an at least semielastic plastic. Preferably, the wind deflector unit comprises at least one concave upstream surface. The wind deflector unit deviates in particular from an end cap, a spring strip, and/or a wiper blade adapter. Advantageously, in an operating state, the wind deflector unit extends over at least a portion, preferably over at least a majority, of an extension of the wiper blade apparatus along the main extension direction. Preferably, the at least one wind deflector unit is formed at least integrally, in particular in a single piece, with the at least one wiper strip unit. Preferably, the wind deflector unit is configured as the surface structure of the wiper strip unit.

In this context, a "support element" is understood in particular as an element that is provided so as to, in at least one operating state, support the wiper strip unit, in particular in the lateral direction, on the wind deflector unit. Preferably, the support element is provided for partially damping a force transferred from the guide bar. The at least one support element is preferably provided so as to, in a mounted state, at least reduce a lateral play of the at least one wiper strip unit opposite the at least one wind deflector unit, without thereby substantially restricting a mobility of the wiper strip unit, in particular in the longitudinal direction. Preferably, in a relaxed state of the wiper strip unit, the support element is substantially stress-free. In particular, a "lateral play" is understood to mean a freedom of movement of the components in question in a wiping direction. It is also contemplated that the at least one support element is provided so as to, in a mounted state, at least reduce of lateral play of the at least one wiper strip unit opposite the at least one spring strip. It is also contemplated that the at least one support element is provided so as to, in a mounted state, reduce a lateral play of at least one sub-element, in particular the wiper base body, opposite the at least one wiper lip. The at least one support element is preferably provided for a force fit between the at least one wiper strip unit and the wind deflector unit, in particular the guide bars. Alternatively or additionally, the at least one support element is preferably provided for a form fit, in particular by supporting on at least one of the guide bars. A "wiping direction" is preferably understood to mean a direction perpendicular to the main extension direction of the wiper strip unit, which runs perpendicular to a surface normal of a surface to be cleaned.

Preferably, the support element extends along a main extension direction of the wiper strip unit over the entire wiper strip unit. A "main extension direction" of an object is in particular understood to mean a direction which runs parallel to a longest edge of a smallest geometrical cuboid, which just completely encloses the object.

In particular, with the design of the wiper blade apparatus according to the invention, an advantageous stabilization of the wiper strip unit can be achieved. In particular, an advantageously quiet wiping of the wiper blade apparatus can be achieved. The wiper lip is advantageously fixed during a wiping operation. The at least one support element can advantageously be formed directly from the wiper strip unit. The at least one support element can advantageously prevent a noisy wiping.

It is further proposed that the wiper strip unit comprise at least two resilient support elements, which are arranged on opposite sides of the wiper base body and which are respectively supported between the wiper base body and at least one of the guide bars. Preferably, the wiper strip unit is configured so as to be mirror-symmetrical to a plane that is parallel to the main extension direction of the wiper strip unit and perpendicular to the wiping direction. As a result, an advantageous fixation of the wiper base body can in particular be achieved. In particular, an advantageously quiet wiping of the wiper blade apparatus can be achieved. The wiper lip is advantageously fixed during a wiping operation.

Furthermore, it is proposed that the wiper base body comprise at least two side walls that respectively bound the damping cavity towards one side, wherein the support elements are respectively arranged directly on one of the side walls. Preferably, the damping cavity has a rectangular cross-sectional shape, in particular in a plane that is perpendicular to the main extension direction of the wiper strip unit. Preferably, the wiper base body comprises a bottom wall facing the wiper lip, a ceiling wall facing the wind deflector unit, and the two side walls, which bound the damping cavity in a plane that is perpendicular to the main extension direction of the wiper strip unit. In particular, the wiper strip unit has a consistent cross-section along the main extension direction. Preferably, the two support elements are arranged on the opposing side walls on a respective outer side facing away from the damping cavity. The two support elements in particular face away from one another. As a result, an advantageous fixation of the wiper base body can in particular be achieved. In particular, an advantageously quiet wiping of the wiper blade apparatus can be achieved. The wiper lip is advantageously fixed during a wiping operation.

The wind deflector unit is in particular shaped so as to apply pressure to the wiper strip unit on both sides of the wiper base body such that the movement of the wiper strip unit in the transverse direction is limited while reversing in order to reduce the reversing noise. Due to the compressibility and flexibility of the support elements, there is only one concentrated load, so that a certain freedom for the movement of the wiper strip unit in the longitudinal direction is still ensured in order to minimize transit noises. To ensure this even more, the inner side of the wind deflector unit, in particular the guide bars, could be made of a very low-friction material and/or could bear a coating.

It is further proposed that the at least two resilient support elements be arranged respectively on opposite sides flush between the wiper base body and one of the guide bars. Preferably, the support elements each abut with an outer end directly against the guide bars and are directly attached to the wiper base body with an inner end. Preferably, the wiper strip unit is arranged in a gap-free manner between the guide bars by means of the support elements. As a result, an advantageous fixation of the wiper base body can in particular be achieved. In particular, an advantageously quiet wiping of the wiper blade apparatus can be achieved.

It is further proposed that the at least one support element of the wiper strip unit be integrally formed with the wiper base body. Preferably, the wiper base body is formed integrally with the wiper lip and the at least one support element. "Integrally" is understood as meaning connected at least by substance-to-substance bonding, for example by a welding process, an adhesive bonding process, a process of molding on and/or another process that appears expedient to the person skilled in the art, and/or advantageously formed in one piece, for example by production from a casting and/or by production in a single- or multi-component injection molding process and advantageously from a single blank. Preferably, the entire wiper strip unit is produced in an extrusion process. However, other production methods that appear to be expedient to those skilled in the art are also conceivable. In particular, the number of components can be kept low as a result.

The support elements can be made of the same material as the wiper base body or can be made of a different material, in particular a stronger or more robust and/or more compressible or flexible material, in order to ensure increased robustness. For this purpose, the wiper strip unit can in particular be produced in a multi-component injection process, in particular a co-extrusion process.

Further, it is proposed that the at least one support element of the wiper strip unit be formed from a diagonally extending bar, which is arranged on the wiper base body with a top end facing away from the wiper lip and which is arranged on the guide bar of the wind deflector unit with a bottom end facing away from the wiper lip. Preferably, the at least one support element is formed by a rectangular bar in a cross-section perpendicular to the main extension direction of the wiper strip unit. Preferably, a longest side edge of the support element is arranged on the wiper base body, wherein a second longest side edge of the support element abuts against the guide bar of the wind deflector unit. As a result, in particular, an advantageously stable support element can be provided. Further, a spring effect can advantageously be realized.

Furthermore, it is proposed that the guide bars of the wind deflector unit comprise, at a respective free bottom end, a support stage, which is provided so as to receive a free end of the at least one support element in a supporting manner. Preferably, the support stage extends inwardly into a receiving region for the wind deflector unit. Preferably, the support stage is formed from a rectangular bar extending along the main extension direction of the wind deflector unit along the entire wind deflector unit. A defined position of the support element can in particular be provided as a result. In particular, a slipping of the at least one support element can be avoided. A defined force initiation point can in particular be defined here.

It is further proposed that the at least one support element of the wiper strip unit be formed from two legs converging into a tip, which, together with a side wall of the wiper base body, form a compressible triangle. The legs are respectively formed from bars that extend along the main extension direction of the wiper strip unit along the entire wiper strip unit. The legs as well as the side wall of the wiper base body form a triangular cross-sectional shape in a cross-section that is perpendicular to the main extension direction of the wiper strip unit, wherein the legs as well as the side wall of the wiper base body bound a triangular cavity in a cross-section that is perpendicular to the main extension direction of the wiper strip unit, which cavity is formed separately from the damping cavity. The cavity serves in particular for the compressibility of the support element. As a result, in particular, an advantageously stable support element can be provided. In particular, a tilting of the support element can be avoided.

It is further proposed that the guide bars of the wind deflector unit comprise on an inner side a respective indentation, which is provided so as to receive the tip of the at least one support element. The indentation is in particular formed by a groove extending along the entire wind deflector unit. Preferably, the indentation serves to avoid a sliding of the at least one support element. A defined position of the support element can in particular be provided as a result. In particular, a slipping of the at least one support element can be avoided. A defined force initiation point can in particular be defined here.

Further, the invention proceeds from a wiper strip unit of the wiper blade apparatus.

The wiper blade apparatus according to the invention is not intended to be limited to the aforementioned application and embodiment. The wiper blade apparatus according to the invention can in particular comprise a number of individual elements, components, and units that deviate from a number mentioned herein in order to fulfill a function described herein. Moreover, for the ranges of values indicated in this disclosure, values lying within the mentioned limits are also intended to be considered disclosed and usable as desired.

BRIEF DESCRIPTION OF THE DRAWINGS

Further advantages will become apparent from the following description of the drawing. The drawing shows two embodiment examples of the invention. The drawing, the description, and the claims contain numerous features in combination. A person skilled in the art will suitably also consider the features individually and combine them into expedient further combinations.

The drawings show.

DETAILED DESCRIPTION

Figure 1:
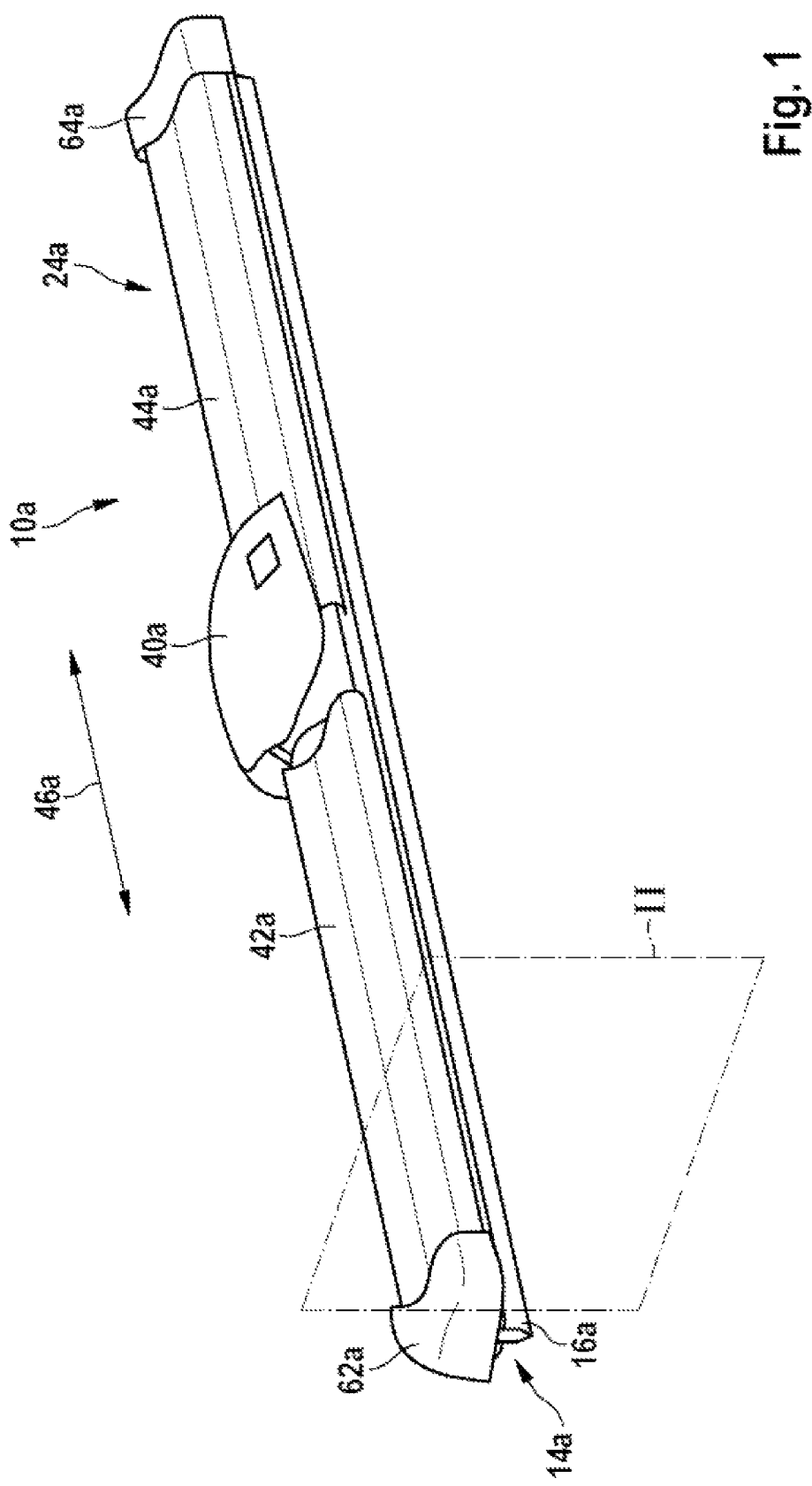
FIG. 1 illustrates a schematic illustration of a wiper blade apparatus according to the invention having a wind deflector unit with two spring strips and with a wiper strip unit.

FIG. 1 shows a wiper blade apparatus 10$a$. The wiper blade apparatus 10$a$ comprises at least one spring strip 12$a$, 12$a'$ (see FIG. 2). The wiper blade apparatus 10$a$ comprises, by way of example, two spring strips 12$a$, 12$a'$. Furthermore, the wiper blade apparatus 10$a$ comprises a wiper strip unit 14$a$. Further, the wiper blade apparatus 10$a$ comprises at least one wind deflector unit 24$a$. Further, the wiper blade apparatus 10$a$ comprises a wiper blade adapter 40$a$. The wiper blade adapter 40$a$ is provided so as to connect the wiper blade apparatus 10$a$ with a wiper arm (not further visible). The wiper blade adapter 40$a$ is provided so as to be directly connected to a wiper arm adapter (not further visible) of the wiper arm (not further visible). The wiper blade adapter 40$a$ is arranged between two sub-sections of the wind deflector unit 24$a$. The wind deflector unit 24$a$ is provided so as to, in a state of being mounted on a motor vehicle (not further visible), repel a driving wind acting on the wiper blade apparatus 10$a$. Further, the wind deflector unit 24$a$ is provided so as to deflect a driving wind and to increase a resulting force in order to increase a contact pressure of the wiper blade apparatus 10$a$ on a vehicle window of the motor vehicle (not further visible). The wind deflector unit 24$a$ of the wiper blade apparatus 10$a$ is formed in two parts. The wind deflector unit 24$a$ is comprised of two wind deflector elements 42$a$, 44$a$. The two wind deflector elements 42$a$, 44$a$ are arranged on opposite sides of the wiper blade adapter 40$a$. The wiper strip unit 14$a$ is held in the wind deflector unit 24$a$ by the two spring strips 12$a$, 12$a'$. The two spring strips 12$a$, 12$a'$ are each guided in a recess 20$a$, 20$a'$ of the wiper strip unit 14$a$ and are encompassed from the outside by the wind deflector unit 24$a$. The two spring strips 12$a$, 12$a'$, when viewed along their main extension direction, are further respectively fixedly connected in their center (not further visible) to the wiper blade adapter 40a. The main extension direction of the spring strips 12a, 12a' corresponds to a main extension direction 46a of wiper blade apparatus 10a and a main extension direction of the wiper strip unit 14a.

The wind deflector unit 24a comprises a wind deflector base body, which forms a spoiler 66a on a top side and which forms a spring strip receptacle 68a on a bottom side in order to receive the spring strips 12a, 12a'. The wind deflector unit 24a at least partially overlaps with a wiper base body 18a of the wiper strip unit 14a. The wind deflector unit 24a comprises two guide bars 26a, 26a' that extend on both sides of the wiper base body 18a. The guide bars 26a, 26a' are respectively formed by rectangular bars, which extend parallel to one another out of the wind deflector base body on a bottom side of the wind deflector base body. The guide bars 26a, 26a' extend along the main extension direction 46a along the entire wind deflector unit 24a.

Preferably, the wiper blade apparatus 10a comprises at least one end cap 62a. Preferably, the wiper blade apparatus 10a comprises at least one further end cap 64a. Preferably, the end caps 62a, 64a are arranged in the longitudinal direction at opposite end regions of a maximum extension of the wiper blade apparatus 10a.

Figure 2:
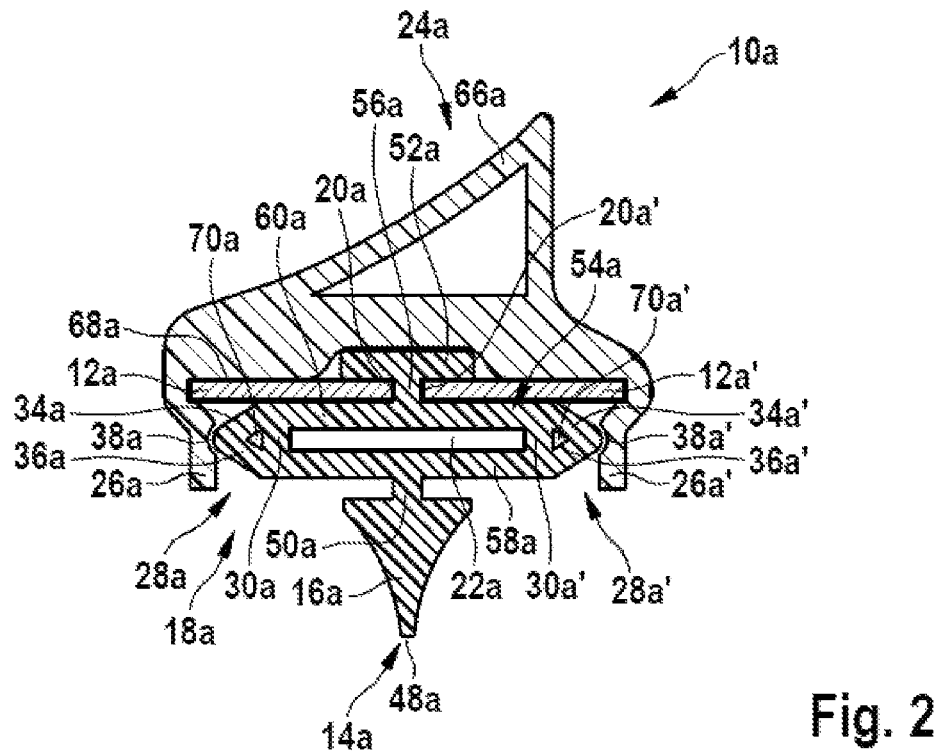
FIG. 2 illustrates the wiper blade apparatus according to the present invention in a schematic cross-section in the cross-sectional plane II-II.

The wiper strip unit 14a is formed from an elongated body having an approximately consistent cross-section over its length. The wiper strip unit 14a is produced in an extrusion process. In principle, however, another production methods that appear to be expedient to those skilled in the art are also conceivable. The wiper strip unit 14a consists substantially of a rubber. However, other materials that appear to be expedient to a person skilled in the art are also generally conceivable. The wiper strip unit 14a comprises a wiper lip 16a and at least one wiper base body 18a. The wiper lip 16a is provided for a direct abutment against the vehicle window. The wiper lip 16a has an approximately triangular cross-section, wherein a free lower edge forms a wiper edge 48a. The wiper lip 16a has an approximately triangular cross-section in a plane that is perpendicular to the main extension direction 46a of the wiper blade apparatus 10a. The wiper base body 18a has an approximately cuboidal basic shape. The wiper base body 18a comprises a cuboid base element 54a. The wiper lip 16a is fixedly connected to the wiper base body 18a. The wiper lip 16a is connected to the base element 54a of the wiper base body 18a via a narrow bar of the wiper base body 18a. On a side facing away from the wiper lip 16a, the wiper base body 18a comprises a header strip 52a. The header strip 52a is connected to the base element 54a of the wiper base body 18a via a narrow bar 56a. The wiper lip 16a can be tilted opposite the wiper base body 18a by the bar 50a. The wiper lip 16a, the wiper base body 18a, and the bar 50a extend, when viewed along the main extension direction 46a of the wiper blade apparatus 10a, over an entire extension of the wiper strip unit 14a. The wiper strip unit 14a has a consistent cross-section (FIG. 2).

The wiper base body 18a forms two recesses 20a, 20a' for receiving one of the spring strips 12a, 12a', respectively. The recesses 20a, 20a' extend along the main extension direction 46a of the wiper blade apparatus 10a over an entire extension of the wiper base body 18a. The recesses 20a, 20a' have a rectangular cross-section and are respectively materially bounded on three sides by the wiper base body 18a. The recesses 20a, 20a' are bounded by the header strip 52a, the bar 56a, and the base element 54a of the wiper base body 18a. The recesses 20a, 20a' have a respective opening via which the recesses 20a, 20a' are respectively opened towards a side that extends parallel to the main extension direction 46a of the wiper blade apparatus 10a. The recesses 20a, 20a' are each arranged on opposite sides of the wiper base body 18a. The recesses 20a, 20a' are respectively arranged on opposite sides of the wiper base body 18a relative to a symmetry plane of the wiper strip unit 14a, which extends parallel to the main extension direction 46a of the wiper blade apparatus 10a and in particular perpendicular to the vehicle window. The openings of the recesses 20a, 20a' respectively face in opposite directions. The spring strips 12a, 12a' can be respectively inserted into the recesses 20a, 20a' via the openings. In a mounted state of the spring strips 12a, 12a', the spring strips 12a, 12a' partially extend from recesses 20a, 20a' (FIG. 2) via the openings.

Further, the wiper base body 18a limits a damping cavity 22a that is separate from the recesses 20a, 20a'. The damping cavity 22a is formed by a cuboidal recess, which is completely surrounded by the wiper base body 18a in a cross-section that is perpendicular to the main extension direction 46a. The damping cavity 22a is arranged in the base element 54a and extends along the main extension direction 46a over the entire extension of the wiper strip unit 14a. The base element 54a has a bottom wall 58a facing the wiper lip 16a, a ceiling wall 60a facing the header strip 52a, and two side walls 30a, 30a', which bound the damping cavity 22a in a plane that is perpendicular to the main extension direction 46a of the wiper blade apparatus 10a. The wiper base body 18a comprises the two side walls 30a, 30a', which respectively bound the damping cavity 22a towards one side. The floor wall 58a, the ceiling wall 60a, and two side walls 30a, 30a' form a hollow rectangle in a plane that is perpendicular to the main extension direction 46a of the wiper blade apparatus 10a, in the center of which rectangle the damping cavity 22a is arranged.

The wiper strip unit 14a comprises two resilient support elements 28a, 28a', which are arranged on the wiper base body 18a and which are arranged on opposite sides of the wiper base body 18a and which are respectively supported between the wiper base body 18a and at least one of the guide bars 26a, 26a'. The wiper strip unit 14a is configured mirror-symmetrically to the symmetry plane that is parallel to the main extension direction of the wiper strip unit 14a and perpendicular to the wiping direction, wherein the support elements 28a, 28a' are respectively arranged on opposite sides of the symmetry plane. The support elements 28a, 28a' are respectively arranged directly on one of the side walls 30a, 30a' of the wiper base body 18a. The two resilient support elements 28a, 28a' are arranged respectively on opposite sides flush between the wiper base body 18a and one of the guide bars 26a, 26a'. The support elements 28a, 28a' each abut with an outer end directly against the guide bars 26a, 26a' and are directly attached to the wiper base body 18a with an inner end. The support elements 28a, 28a' are attached with an inner end directly to the base element 54a. The support elements 28a, 28a' of the wiper strip unit 14a are integrally formed with the wiper base body 18a. The support elements 28a, 28a' can be made of the same material as the wiper base body 18a or can be made of a different material, in particular a stronger or more robust and/or more compressible or flexible material, in order to ensure increased robustness. For this purpose, the wiper strip unit 14a can in particular be produced in a multi-component injection process, in particular a co-extrusion process.

The support elements 28a, 28a' of the wiper strip unit 14a are formed from two legs 34a, 34a', 36a, 36a' converging into a tip, each of which, together with a side wall 30a, 30a' of the wiper base body 18a, form a compressible triangle. The legs 34a, 34a', 36a, 36a' are respectively formed from bars that extend along the main extension direction of the wiper strip unit 14a along the entire wiper strip unit 14a. The legs 34a, 34a', 36a, 36a' as well as the side walls 30a, 30a' of the wiper base body 18a, 18a' form a triangular cross-sectional shape in a cross-section that is perpendicular to the main extension direction of the wiper strip unit 14a, wherein the legs 34a, 34a', 36a, 36a' as well as the side walls 30a, 30a' of the wiper base body 18a bound a respective triangular cavity 70a, 70a' in a cross-section that is perpendicular to the main extension direction of the wiper strip unit 14a, which cavities are formed separately from the damping cavity 22a. The cavities 70a, 70a' are arranged on both sides of the damping cavity 22a. The cavities 70a, 70a' in particular serve for the compressibility of the support elements 28a, 28a'.

The guide bars 26a, 26a' of the wind deflector unit 24a each have an indentation 38a, 38a' on an inner side, which is provided so as to each receive the tips of the associated support element 28a, 28a'. The indentation 38a, 38a' is formed from a groove extending along the entire wind deflector unit 24a. The indentations 38a, 38a' serve to avoid a slipping of the support elements 28a, 28a'.

Due to the compressibility and flexibility of the support elements 28a, 28a', there is only one concentrated load, so that a certain freedom for the movement of the wiper strip unit 14a in the longitudinal direction is still ensured in order to minimize transit noises. To ensure this even more, the inner side of the wind deflector unit 24a, in particular the guide bars 26a, 26a', could be made of a very low-friction material and/or could be provide with a coating.

Figure 3:
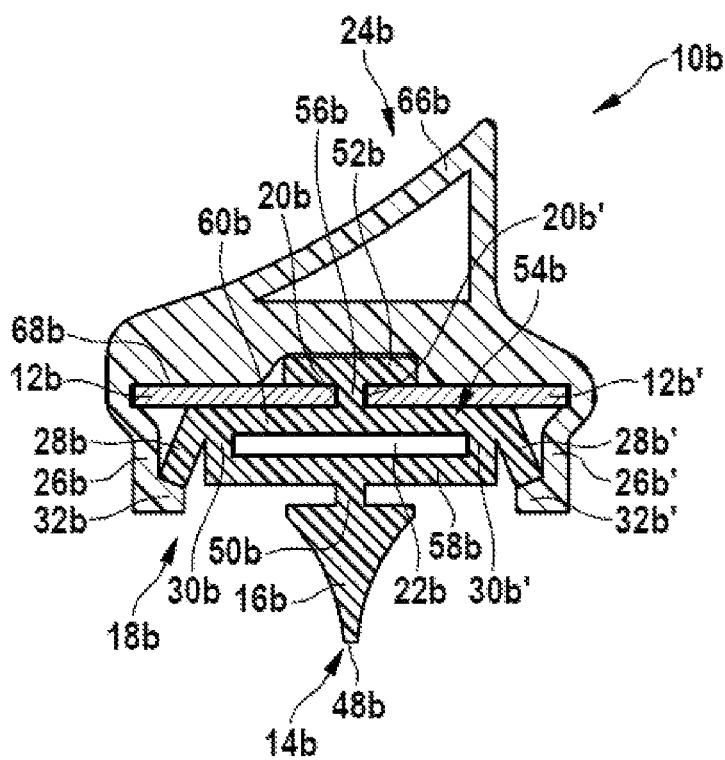
FIG. 3 illustrates an alternative wiper blade apparatus according to the invention in a schematic sectional illustration.

FIG. 3 shows a further embodiment example of the invention. The following description and the drawing are substantially limited to the differences between the embodiment examples, wherein reference can basically also be made to the drawing and/or the description of the other embodiment examples, in particular of FIGS. 1 to 2, with respect to identically designated components, in particular with respect to components having the same reference numbers. In order to distinguish the embodiment examples, the letter a is added to the reference numbers of the embodiment example in FIGS. 1 to 2. In the embodiment example of FIG. 3, the letter a is replaced by the letter b.

FIG. 3 shows a wiper blade apparatus 10b in a schematic cross-sectional view. The wiper blade apparatus 10b comprises, by way of example, two spring strips 12b, 12b'. Furthermore, the wiper blade apparatus 10b comprises a wiper strip unit 14b. Further, the wiper blade apparatus 10b comprises at least one wind deflector unit 24b.

The wind deflector unit 24b comprises a wind deflector base body, which forms a spoiler 66b on a top side and which forms a spring strip receptacle 68b on a bottom side in order to receive the spring strips 12b, 12b'. The wind deflector unit 24b at least partially overlaps with a wiper base body 18b of the wiper strip unit 14b. The wind deflector unit 24b comprises two guide bars 26b, 26b' that extend on both sides of the wiper base body 18b. The guide bars 26b, 26b' are respectively formed by rectangular bars, which extend parallel to one another out of the wind deflector base body on a bottom side of the wind deflector base body. The guide bars 26b, 26b' extend along a main extension direction 46b along the entire wind deflector unit 24b.

The wiper strip unit 14b is formed from an elongated body having an approximately consistent cross-section over its length. The wiper strip unit 14b comprises a wiper lip 16b and at least one wiper base body 18b. The wiper base body 18b comprises a cuboid base element 54b. The wiper lip 16b is fixedly connected to the wiper base body 18b.

The wiper strip unit 14b comprises two resilient support elements 28b, 28b', which are arranged on the wiper base body 18b and which are arranged on opposite sides of the wiper base body 18b and which are respectively supported between the wiper base body 18b and at least one of the guide bars 26b, 26b'. The wiper strip unit 14b is configured mirror-symmetrically to the symmetry plane that is parallel to the main extension direction of the wiper strip unit 14b and perpendicular to the wiping direction, wherein the support elements 28b, 28b' are respectively arranged on opposite sides of the symmetry plane. The support elements 28b, 28b' are respectively arranged directly on one of the side wall 30b, 30b' of the wiper base body 18b. The two resilient support elements 28b, 28b' are arranged respectively on opposite sides flush between the wiper base body 18b and one of the guide bars 26b, 26b'. The support elements 28b, 28b' each abut with an outer end directly against the guide bars 26b, 26b' and are directly attached to the wiper base body 18b with an inner end. The support elements 28b, 28b' are attached with an inner end directly to the base element 54b. The support elements 28b, 28b' of the wiper strip unit 14b are integrally formed with the wiper base body 18b.

The support elements 28b, 28b' of the wiper strip unit 14b are respectively formed from a diagonally extending bar, which is arranged on the wiper base body 18b with a top end facing away from the wiper lip 16b and which is arranged on the guide bar 26, 26' of the wind deflector unit 24b with a bottom end facing away from the wiper lip 16b. The support elements 28b, 28b' are formed by a rectangular bar in a cross-section perpendicular to the main extension direction of the wiper strip unit 14b. A longest side edge of the support elements 28b, 28b' is respectively arranged on the wiper base body 18b, wherein a second longest side edge of the support elements 28b, 28b' respectively abuts against one of the guide bars 26b, 26b' of the wind deflector assembly 24b.

The guide bars 26b, 26b' of the wind deflector unit 24b have a respective support stage 32b, 32b' at a free bottom end, which is provided so as to receive a respective free end of one of the support elements 28b, 28b' in a supporting manner. The support stages 32b, 32b' extend inwardly into a receiving region for the wiper strip unit 14b. The support stages 32b, 32b' are respectively formed from a rectangular bar extending along the main extension direction of the wind deflector unit 24b along the entire wind deflector unit 24b. The support elements 28b, 28b' stand with a respective free end on a top side of one of the support stages 32b, 32b'. The support elements 28b, 28b' abut with a respective free end against the top side of one of the support stages 32b, 32b' as well as the inside of the guide bars 26b, 26b'.

The invention claimed is:

1. A wiper blade apparatus with at least one spring strip (12a, 12a'; 12b, 12b'), having at least one wiper strip unit (14a; 14b), which comprises at least one wiper lip (16a; 16b) and at least one wiper base body (18a; 18b), which bounds at least one recess (20a; 20b) to a receptacle of the at least one spring strip (12a, 12a'; 12b, 12b') and at least one damping cavity (22a; 22b) that is separate from the recess (20a; 20b), and having at least one wind deflector unit (24a; 24b), which at least partially overlaps with the wiper base body (18a; 18b) of the wiper strip unit (14a; 14b) and which comprises at least two guide bars (26a, 26a'; 26b, 26b'), which extends to both sides of the wiper base body (18a; 18b), wherein the wiper strip unit (14a; 14b) comprises at least one resilient support element (28a, 28a'; 28b, 28b'), which is arranged on the wiper base body (18a; 18b) and is supported between the wiper base body (18a; 18b) and at least one of the guide bars (26a, 26a'; 26b, 26b'), wherein the wiper base body (18a; 18b) includes a side wall (30a, 30a', 30b, 30b'), and wherein the side wall is positioned laterally between one of the resilient support elements (28a, 28a'; 28b, 28b') and the damping cavity (22a; 22b).

2. The wiper blade apparatus according to claim 1, wherein the wiper strip unit (14a; 14b) comprises at least two resilient support elements (28a, 28a'; 28b, 28b') arranged on opposite sides of the wiper base body (18a; 18b) and which are respectively supported between the wiper base body (18a; 18b) and at least one of the guide bars (26a, 26a', 26b, 26b').

3. The wiper blade apparatus according to claim 2, wherein the side wall is a first side wall, and wherein the wiper blade apparatus includes a second side wall, wherein the first and second side walls respectively bound the damping cavity (22a; 22b), wherein the support elements (28a, 28a'; 28b, 28b') are respectively arranged directly the first and second side walls (30a, 30a'; 30b, 30b').

4. The wiper blade apparatus according to claim 2, wherein the at least two resilient support elements (28a, 28a'; 28b, 28b') are respectively arranged on opposite sides flush between the wiper base body (18a; 18b) and one of the guide bars (26a, 26a'; 26b, 26b').

5. The wiper blade apparatus according to claim 1, wherein the at least one support element (28a, 28a'; 28b, 28b') of the wiper strip unit (14a; 14b) is integrally formed with the wiper base body (18a; 18b).

6. The wiper blade apparatus according to claim 1, wherein the at least one support element (28b, 28b') of the wiper strip unit (14b) is formed from a diagonally extending bar, which is arranged on the wiper base body (18b) with a top end facing away from the wiper lip (16b) and which is arranged on the guide bar (26, 26') of the wind deflector unit (24b) with a bottom end facing away from the wiper lip (16b).

7. The wiper blade apparatus according to claim 1, wherein the guide bars (26b, 26b') of the wind deflector unit (24b) comprise, at a respective free bottom end, a support stage (32b, 32b'), which is provided so as to receive a free end of the at least one support element (28b, 28b') in a supporting manner.

8. The wiper blade apparatus according to claim 1, wherein the at least one support element (28a, 28a') of the wiper strip unit (14a) is formed from two legs (34a, 34a', 36a, 36a') converging into a tip, which, together with the side wall (30a, 30a') of the wiper base body (18a), form a compressible triangle.

9. The wiper blade apparatus according to claim 8, wherein the guide bars (26a, 26a') of the wind deflector unit (24a) comprise on an inner side a respective indentation (38a, 38a'), which is provided so as to receive the tip of the at least one support element (28a, 28a').

10. The wiper blade apparatus according to claim 1, wherein the one of the resilient support elements (28a, 28a'; 28b, 28b') is positioned laterally between the side wall (30a, 30a') and one of the guide bars (26a, 26a'; 26b, 26b').

11. A wiper blade apparatus with at least one spring strip (12b, 12b'), having at least one wiper strip unit (14b), which comprises at least one wiper lip (16b) and at least one wiper base body (18b), which bounds at least one recess (20b) to a receptacle of the at least one spring strip (12b, 12b') and at least one damping cavity (22b) that is separate from the recess (20b), and having at least one wind deflector unit (24b), which at least partially overlaps with the wiper base body (18b) of the wiper strip unit (14b) and which comprises at least two guide bars (26b, 26b'), which extends to both sides of the wiper base body (18b), wherein the wiper strip unit (14b) comprises at least one resilient support element (28b, 28b'), which is arranged on the wiper base body (18b) and is supported between the wiper base body (18b) and at least one of the guide bars (26b, 26b'), wherein the at least one support element (28b') of the wiper strip unit (14b) is formed from a diagonally extending bar, which is arranged on the wiper base body (18b) with a top end facing away from the wiper lip (16b) and which is arranged on the guide bar (26b, 26b') of the wind deflector unit (24b) with a bottom end facing away from the wiper lip (16b).

12. The wiper blade apparatus according to claim 11, wherein the wiper strip unit (14b) comprises at least two resilient support elements (28b, 28b') arranged on opposite sides of the wiper base body (18b) and which are respectively supported between the wiper base body (18b) and at least one of the guide bars (26b, 26b').

13. The wiper blade apparatus according to claim 12, wherein the at least two resilient support elements (28b, 28b') are respectively arranged on opposite sides flush between the wiper base body (18b) and one of the guide bars (26b, 26b').

14. The wiper blade apparatus according to claim 11, wherein the at least one support element (28b, 28b') of the wiper strip unit (14b) is integrally formed with the wiper base body (18b).

15. A wiper blade apparatus with at least one spring strip (12b, 12b'), having at least one wiper strip unit (14b), which comprises at least one wiper lip (16b) and at least one wiper base body (18b), which bounds at least one recess (20b) to a receptacle of the at least one spring strip (12b, 12b') and at least one damping cavity (22b) that is separate from the recess (20b), and having at least one wind deflector unit (24b), which at least partially overlaps with the wiper base body (18b) of the wiper strip unit (14b) and which comprises at least two guide bars (26b, 26b'), which extends to both sides of the wiper base body (18b), wherein the wiper strip unit (14b) comprises at least one resilient support element (28b, 28b'), which is arranged on the wiper base body (18b) and is supported between the wiper base body (18b) and at least one of the guide bars (26b, 26b'), wherein the guide bars (26b, 26b') of the wind deflector unit (24b) comprise, at a respective free bottom end, a support stage (32b, 32b'), which is provided so as to receive a free end of the at least one support element (28b, 28b') in a supporting manner.

16. The wiper blade apparatus according to claim 15, wherein the wiper strip unit (14b) comprises at least two resilient support elements (28b, 28b') arranged on opposite sides of the wiper base body (18b) and which are respectively supported between the wiper base body (18b) and at least one of the guide bars (26b, 26b').

17. The wiper blade apparatus according to claim 16, wherein the at least two resilient support elements (28b, 28b') are respectively arranged on opposite sides flush between the wiper base body (18b) and one of the guide bars (26b, 26b').

18. The wiper blade apparatus according to claim 15, wherein the at least one support element (28b, 28b') of the wiper strip unit (14b) is integrally formed with the wiper base body (18b).

* * * * *